Figure 1:
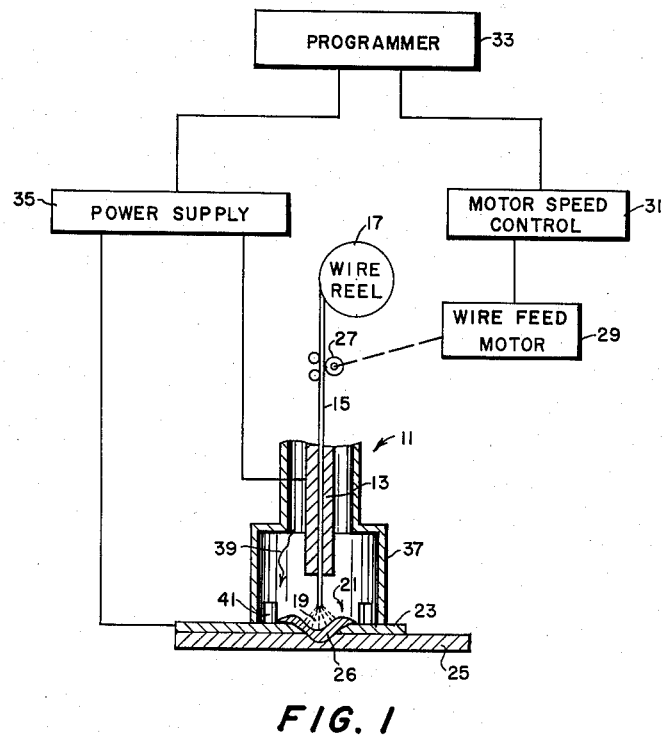

Sept. 3, 1963 W. M. McCAMPBELL ET AL 3,102,948
ELECTRIC ARC WELDING
Filed Nov. 8, 1961 2 Sheets-Sheet 1

WILLIAM M. McCAMPBELL
JAMES C. McCAIG
INVENTORS

BY
ATTORNEYS

WILLIAM M. McCAMPBELL
JAMES C. McCAIG
INVENTORS

ATTORNEYS

United States Patent Office 3,102,948
Patented Sept. 3, 1963

3,102,948
ELECTRIC ARC WELDING
William M. McCampbell and James C. McCaig, Huntsville, Ala., assignors to the United States of America as represented by the Administrator of the National Aeronautics and Space Administration
Filed Nov. 8, 1961, Ser. No. 151,112
13 Claims. (Cl. 219—137)
(Granted under Title 35, U.S. Code (1952), sec. 266)

The invention described herein may be manufactured and used by or for the Government of the United States of America for governmental purposes without the payment of any royalties thereon or therefor.

This invention relates to electric arc spot welding and more particularly to a method of electric arc spot welding.

Generally, in electric arc welding, welding heat is obtained from an electric arc formed between a metal workpiece and an electrode which melts a portion of the metal workpiece at the arc location or welding zone and forms a molten pool or puddle which subsequently is allowed to solidify. When necessary, additional molten filler metal is introduced into the molten pool by feeding a consumable wire or rod into the arc or by using a consumable electrode. Protection of the molten pool and adjacent hot areas of the metal work from atmospheric oxidation is usually accomplished by an inert gas shield.

To utilize existing arc welding techniques, which were satisfactory for continuous seam welding, for spot welding in those applications where use of resistance spot welding was considered to be impractical or impossible has been attempted for a long period of time, but problems presented themselves which were considered to be insurmountable for obtaining spot welds having a solidified puddle or nugget of uniformly high strength and good appearance. These problems included:

(1) Cracking of the workpieces;
(2) Necessity for drilling through a top workpiece into a lower workpiece to achieve penetration and to eliminate oxides at the adjoining surfaces or interface;
(3) Necessity for excessive build-up of the nugget to achieve proper penetration;
(4) Nugget defects such as gas pockets, porosity, and craters.

The present invention, however, has overcome all of these prior difficulties and problems by a new and basic concept of electric arc spot welding which will join heavy as well as thin metal workpieces with spot welds of such superior characteristics as to exceed those accomplished by resistance spot welding, and prior sigma (shielded-inert-gas metal-arc) spot welding, and other known methods.

Accordingly, it is an object of the present invention to provide an arc spot welding process which achieves a nugget of uniform characteristics.

Another object is to provide an arc spot welding process which eliminates oxides at adjoining surfaces of metal workpieces.

A further object is to provide an arc spot welding process which eliminates all predrilling of metal workpieces.

Still another object is to provide an electric arc spot welding process which achieves a nugget free of any craters.

Other and further objects, uses, and advantages of the present invention will become apparent as the description proceeds.

In accordance with the present invention, a welding arc is struck between at least one electrode and a metal workpiece. Filler material is introduced into the arc and the arc is varied as to its length, voltage, and current density to a predetermined program to gouge out a recess in the weld zone of the workpiece, and then to gradually build up a puddle within the recess so that gases may escape from the puddle and any thermal cracking will be minimized.

Figure 2:
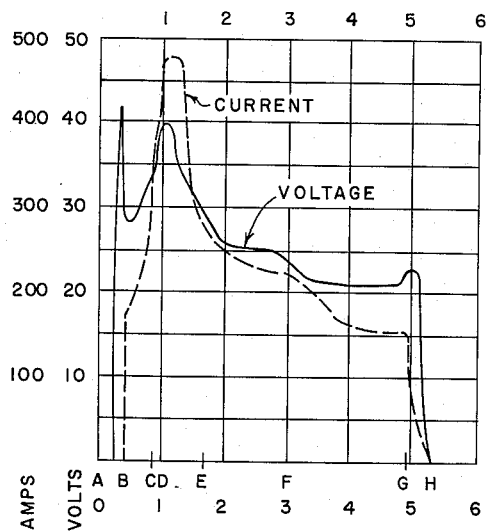

This will be more readily understood by the following detailed description of the novel welding process in conjunction with apparatus for carrying it out when taken together with the accompanying drawings in which:

FIGURE 1 is a schematic diagram of an apparatus set-up used to carry out the present invention;
FIGURE 2 is a graphical representation illustrating operating conditions; and
FIGURES 3 to 9 are sequential partial cross sectional views of an arc welding gun operating upon workpieces to be joined in accordance with the present invention.

Referring now to the drawings, there is shown in FIGURE 1 a welding gun 11 having an electrical contact tube 13 through which a consumable metal wire or electrode 15 is fed from a storage reel 17 toward an arc 19 that is energized between the tip or end of such wire 15 and a weld zone 21 of upper and lower metal workpieces 23 and 25, respectively, whereby a molten puddle 26 is formed. The consumable wire 15 is supplied to the gun 11 through feed rolls 27 driven by an adjustable speed wire feed motor 29 which operates at a selected speed after adjustments have been made by a motor speed control 31 in response to command signals from a programmer 33. The consumable wire 15 and workpieces 23 and 25 are energized by an adjustable power supply 35 which is adjustable to apply a selected voltage potential between the tip or end of the consumable wire 15 and the weld zone 21 of the workpieces 23 and 25 in response to command signals from the programmer 33.

The welding gun 11 may be of the type described in U.S. Patent No. 2,829,238, issued to R. L. Hackman on April 1, 1958, and includes a nozzle 37 to which a flow of inert gas or gases 39 is supplied to shroud the arc 19 and purge a space enclosed by the nozzle 37 of deleterious gases which escape through vents 41 in the periphery of the nozzle 37.

In the operation of an apparatus set-up illustrated by FIGURE 1, the desired arc voltage, welding current, and arc length, are obtained by controlling the voltage output of the power supply 35 and the rate of the wire feed of the motor 29. Thus, the programmer 33 may be a mechanical or electronic sequential timer or a function generator which gives a proper sequence of signals to a compatible power supply 35 and to a compatible motor speed control 31. A suitable apparatus set-up which has proven to be satisfactory includes a conventional multiple function electronic timer for the programmer 33, a conventional constant potential power source having magnetic amplifier controls for the power supply 35 and a conventional electronic governor-type motor speed control for the motor control 31. In this type of apparatus set up, the electronic timer type programmer 33 would electrically switch, in the proper sequence, to different potentiometers in the magnetic amplifier control of the constant potential type power supply 35 and would also electrically switch to different potentiometers in the control circuit of the conventional electronic governor-type motor speed control 31 whereby the arc voltage and wire feed rate are changed at precise intervals during a spot weld cycle.

It is well understood by those versed in the art that the heat input to a weld zone is the product of the arc voltage and welding current. Also, the weld area is directly proportional to the length of the arc with other variables remaining substantially constant. Thus, it can be seen that in the method according to this invention the arc heat is varied and the arc length is also varied to achieve the specific conditions within a weld zone which results in a superior spot weld. Because the parameters of the present invention will vary as to the base metal and thickness of the workpieces 23 and 25, the values of the arc heat, i.e., arc voltage and welding current, and arc length will be described hereinafter by using terms such as medium, long, high, short, etc. in reference to the normal arc heat and arc length used by skilled welders in obtaining a good seam weld under similar conditions.

FIGURE 2 is a graph of a typical spot weld cycle in acordance with the present invention in which the apparatus set-up of FIGURE 1 is utilized in welding heavy aluminum sheets having a thickness in the order of 0.25 inch. In the graph, the ordinate represents the arc voltage in volts and the welding current in amperes and the abscissa represents time in seconds. For convenience of explanation, the abscissa is further divided into definite points of time as designated by the letters, A, B, C, D, etc. whereby distinct stages of operation of the present welding process may be designated as AB, BC, CD, etc. Thus, by following the graph of FIGURE 2 in conjunction with FIGURES 3 to 9 which illustrate, sequentially, the action of the welding arc 19 upon the workpieces 23 and 25 in the same distinct intervals of time the novel process of the present invention will be more easily understood.

Figure 3:
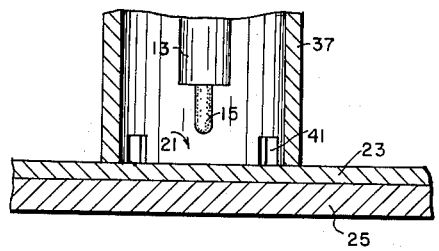
Figure 7:
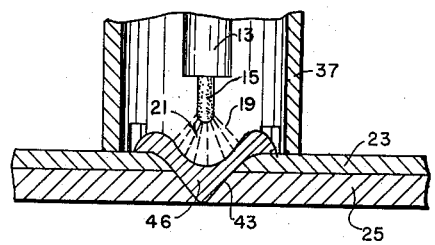

The initial signal by the programmer 33 at time A of the weld cycle shown in FIGURE 2 energizes the power supply 35, the motor speed control 31, the wire feed motor 29, and any auxiliary controls and/or apparatus (not shown) such as which provides the shielding gas 39 so that at time B, some milliseconds later, the arc 19 is struck between the tip of the wire 15 and the weld zone 21 of the workpieces 23 and 25. This starting interval AB is illustrated in FIGURE 3 which shows the welding gun nozzle 37 in contact with the upper workpiece 23 and the consumable wire 15 being driven toward the workpiece 23.

Figure 4:
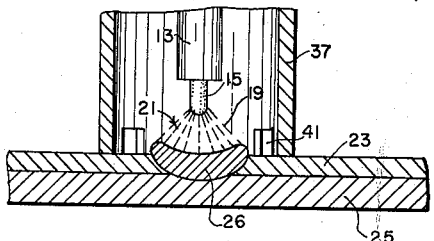

When the arc 19 is struck at time B, its parameters of voltage, current density, and length are set to provide for a medium arc heat relative to normal seam welding but with a longer arc length so that the weld zone 21 of the workpieces 23 and 25 is preheated to a molten condition, as shown in FIGURE 4, and very little metal is deposited within the weld zone 21 from the consumable wire 15. In the apparatus set-up of FIGURE 1, this is accomplished by signals at time B from the programmer 33 setting a high voltage output for the power supply 35 and a low rate of wire feed by the motor speed control 31 such that a long arc length and, consequently, a medium welding current is produced.

Figure 5:
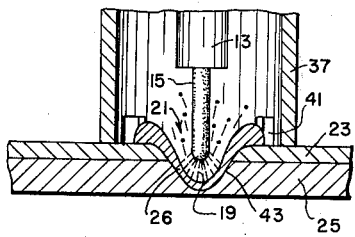

The parameters desired at time B are held for a relatively short time, which is sufficient to preheat the weld zone 21, and by time C the parameters of the arc 19 are shifted to provide for an extremely high arc heat and an extremely short arc length which causes the wire 15 and the arc 19 to gouge and blow out the existing material, particularly the molten material 26, from the upper part of the weld zone 21 and to create a recess 43 as shown in FIGURE 5. It will be obvious to those skilled in the art that this is accomplished by the apparatus set-up of FIGURE 1 at time C by programming an extremely high voltage output for the power supply 35 and an extremely high rate of wire feed by the motor speed control 31 such that a short arc length and, consequently, a high welding current is produced.

Figure 6:
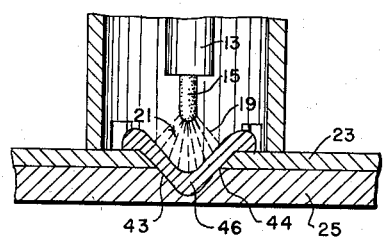

The parameters of the arc 19 at time C are also held only for a short interval, which is sufficient to form the recess 43, and at time D are shifted to slightly decrease the arc heat and to increase the arc length, as shown in FIGURE 6, whereby a wider heat affected area, particularly at the interface 44 or adjoining surfaces of the workpieces 23 and 25, is produced within the weld zone 21. By providing a wider heat affected area at time D, the sides of the recess 43 are melted which, effectively, increases the size of the recess 43 while at the same time the molten metal from the tip of the wire 15 which is fed into the arc 19 is allowed to be deposited within the recess 43 and form a molten puddle 46.

In the apparatus set-up of FIGURE 1, the programmer 33 at time D provides signals to the power supply 35 to decrease the arc voltage slightly and to the motor speed control 31 to decrease the rate of wire feed. The parameters of the arc 19 at time D are held only for the time necessary to melt the sides of the recess 43 and then are again shifted at time E to greatly reduce the arc heat to silghtly higher than normal seam welding while holding the arc length to about the same length.

Thus, by time E, the formation and shaping of the recess 43 is completed and the build-up of a molten puddle 46 within the recess 43 is the primary object of remaining part of the weld cycle. The apparatus set-up of FIGURE 1, therefore, provides at time E for a decrease in the voltage output of the power supply 35 and a decrease in the rate of wire feed by the motor speed control 31 so that the desired welding current and arc length are obtained.

Figure 8:
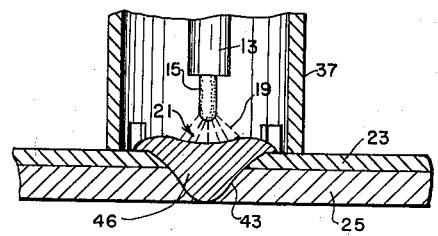

The parameters of the arc 19 at time E are held for a relatively long time interval to build up the molten puddle 46 to over half the depth of the original recess 43, as shown in FIGURE 7, and then are again changed at time F to decrease the arc heat slightly below that required for good seam welding while the arc length remains substantially constant so that the molten puddle 46 continues to build up as shown in FIGURE 8 but at a decreased rate. The apparatus set-up of FIGURE 1, therefore, again provides at time F for a decrease in the voltage output of the power supply 35 and a decrease in the rate of wire feed by the motor speed control 31 to achieve the desired welding current and arc length.

Figure 9:
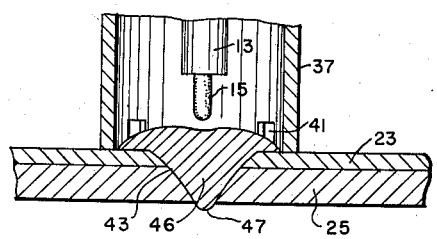

The arc 19 may be interrupted when the molten puddle 46 is sufficiently built up where a crater or recess no longer exists at time G. However, with the apparatus set-up of FIGURE 1 the low arc voltage and low wire feed rate at time G would probably result in the wire sticking to the molten puddle 46 if the arc was interrupted. Therefore, in this instance, the programmer 33 at time G gives a signal to the motor speed control 31 to stop the wire feed motor 29 and a signal to the power supply 35 to increase the arc voltage slightly whereby the consumable wire 15 will be melted or burned back sufficiently not to stick in the molten puddle 46 when the arc is interrupted at time H by a signal from the programmer 33 de-energizing the power supply 35. Following the interruption of the arc 19, the molten puddle 46 solidifies into a so-called nugget as shown in FIGURE 9.

As indicated by FIGURES 6 to 9, the heat input into the weld zone 21 will usually effectively increase both the size and depth of the original recess 43 by melting the surrounding existing metal of the workpieces 23 and 25. The melted material will become a part of the molten puddle 46, and it is not unusual for the puddle 46 to increase in depth until a slight fall or projection 47 exists below the exposed lower surface of the lower workpiece 23. This fall 47 is not detrimental and is a good indication that proper penetration of the metal workpieces 23 and 25 has taken place.

It will be noticed by the graph of FIGURE 2 that an inherent time interval is required in the operation of the apparatus set-up of FIGURE 1 to sequentially change the arc voltage and wire feed rate at the indicated times to obtain the desired arc parameters which result in the sloping of the arc voltage and current curves as shown. However, typical values for a spot weld cycle at the indicated time intervals for joining two aluminum sheets of aluminum alloy 5456 (Aluminum Association Standard) having a thickness of 0.125 to 0.250 inch with a consumable electrode of aluminum alloy 5356 (Aluminum Association Standard) having a diameter of 0.094 inch is as follows:

| Interval | Duration in seconds | Arc voltage in volts | Welding current in amperes |
|---|---|---|---|
| AB | 0.33 | 45 (no load) | |
| BC | 0.40 | 35 | 250 |
| CD | 0.25 | 40 | 450 |
| DE | 0.66 | 30 | 300 |
| EF | 1.33 | 24 | 225 |
| FG | 1.69 | 21 | 160 |
| GH | 0.20 | 23 | 160 to 50 |

Thus, it is apparent that a novel welding process has been developed which programs the arc heat and arc length within precise limits to achieve a superior nugget. Each step has been developed to take full advantage of the previous step or steps and to overcome difficulties which have arisen with prior welding techniques.

For example, preheat step interval BC heats and melts the existing base material of the weld zone 21 whereby during the following time interval CD the existing base material is easily blown out to form a recess 43 by an arc 19 having a high heat and short length. This effectively eliminates all troublesome oxides from the welding zone 21 and assures good penetration of the molten puddle 46 subsequently built up within the recess 43. Thus, a major significance of the present invention is apparent in that the prior technique of predrilling heavy metal workpieces has been eliminated under conditions which prevent the reformation of any oxides. Also, the prior difficulty of accurately positioning a welding gun over the predrilled hole to insure the consumable electrode is within the hole's center has been eliminated.

Further, the following time interval DE, in which the arc 19 is made longer and its heat spread over a wider area to melt the sides of the recess 43, helps in the formation of a larger puddle 46, particularly at the interface 44. Thus, another major problem with prior spot welding techniques in which the resulting nugget was of such small cross section at the interface of the workpieces that it had very little shear strength is overcome.

Also, the relatively long gradual buildup of the molten puddle 46 during the time intervals EF and FG gives ample time for gases which may be trapped and packed within the puddle 46 to come to the surface and escape and also gives ample time for a gradual cooling of the molten puddle 46 from the bottom upwards whereby any thermal cracking is minimized. Thus, the gradual increase in the molten puddle 46 within the recess 43 in successively reducing heat increments or stages reduces cracking, porosity, and formation of a crater in the resulting nugget or solidified puddle 46.

Obviously, many modifications and variations of the present invention are possible in light of the above teachings. It is, therefore, to be understood that within the scope of the appended claims the invention may be practiced other than as specifically described.

What is claimed is:

1. In the art of gas-shielded electric arc spot welding metal workpieces by utilizing a programmer to command both a constant potential power supply and a motor speed control and also utilizing a consumable wire electrode fed by a motor at a rate determined by said motor speed control, said electrode and metal workpieces being in circuit relation with said power supply, the improved method, comprising:

(a) striking an electric arc between said electrode and a finite zone of said workpieces at a preselected voltage and at a preselected welding current to provide a high arc heat and long arc length whereby said finite zone is preheated to a molten condition and very little metal is deposited within said finite zone from said consumable electrode;
   (b) then increasing said preselected voltage to a second preselected voltage and greatly increasing said preselected welding current to a second preselected welding current to provide an extremely high arc heat and an extremely short arc length whereby existing material within said finite zone is partially gouged and blown out by said arc to form a deep narrow recess;
   (c) then slightly lowering said second preselected voltage to a third preselected voltage and slightly lowering said second preselected welding current to a third preselected welding current to provide a high arc heat and a medium arc length whereby the sides of said deep recess are melted;
   (d) then decreasing said third preselected voltage to a fourth preselected voltage and decreasing said third preselected welding current to a fourth preselected welding current to provide a slightly higher than normal arc heat and a medium arc length whereby molten material from said electrode is gradually deposited within said recess to form a molten puddle;
   (e) then decreasing said fourth preselected voltage to a fifth preselected voltage and decreasing said fourth preselected welding current to a fifth preselected welding current to provide a slightly lower than normal arc heat and a medium arm length whereby molten material from said electrode is deposited at a more gradual rate within said recess to complete the formation of said molten puddle;
   (f) then increasing said fifth preselected voltage and decreasing said fifth welding current whereby said electrode is melted back; and
   (g) then interrupting said arc whereby said molten puddle may solidify.

2. In the art of gas-shielded electric arc spot welding metal workpieces utilizing a programmer to command both a constant potential power supply and a motor speed control and also utilizing a consumable wire electrode fed by a motor at a rate determined by said motor speed control, said electrode and metal workpieces being in circuit relation with said power supply, the improved method, comprising:

(a) striking an arc between said electrode and a finite zone of said workpieces at a preselected voltage and welding current to preheat said finite zone;
   (b) then increasing greatly said first preselected voltage and welding current to a second preselected voltage and welding current to blow out material from said finite zone and form a recess;
   (c) then decreasing slightly said second preselected voltage and welding current to a third preselected voltage and welding current to melt the sides of said recess;
   (d) then decreasing said third preselected voltage and welding current to a fourth preselected voltage and welding current to build up a molten puddle within said recess at a gradual rate to allow gases trapped within the puddle to escape;
   (e) then decreasing said fourth preselected voltage and welding current to a fifth preselected voltage and welding current to continue building up said molten puddle within said recess but at a more gradual rate; and
   (f) then interrupting said arc when said molten puddle is built up whereby the puddle will completely solidify.

3. In the art of electric spot welding metal workpieces by utilizing a consumable wire electrode and a power supply connected to said electrode and said metal workpieces wherein an arc is struck between said electrode and a finite zone of said metal workpieces and an inert gas shield is provided to shield said arc, the improved method of:

(a) first, supplying a preselected voltage to said arc and a preselected rate of feeding said electrode into said arc whereby said finite zone is heated and partially melted;

(b) second, greatly increasing said preselected voltage to said arc to a second preselected voltage and greatly increasing said preselected rate of feeding said electrode to a second preselected rate whereby material within said finite zone is blown out to form a recess;

(c) third, slightly lowering said second prehelected voltage to a third preselected voltage and lowering said second preselected rate of feeding said electrode to a third preselected rate whereby the sides of said recess are melted; and (d) fourth, lowering said third preselected voltage to a fourth preselected voltage and lowering said second preselected rate of feeding said electrode to a fourth preselected rate whereby material from said consumable electrode builds up a molten puddle within said recess in a gradual manner whereby gases which may be trapped within said molten puddle are allowed to come to the surface of said molten puddle and escape, and thermal cracking is minimized.

4. A method of electric arc spot welding metal workpieces together by utilizing a consumable wire electrode in an electrical circuit relationship with said workpieces, comprising:

(a) striking an arc between said electrode and a welding zone of said workpieces;

(b) supplying a preselected electrical potential between said electrode and said workpieces and a preselected feeding rate for said electrode to provide for a medium welding current to heat said weld zone;

(c) then greatly increasing said electrical potential and greatly increasing said feed rate to provide a high welding current to gouge and blow out existing material from said weld zone and form a recess therein;

(d) then slightly lowering said electrical potential and slightly lowering said electrode feed rate to provide slightly less welding current to melt the sides of said recess;

(e) then again lowering said electrical potential and again lowering said electrode feed rate to provide a slightly higher than medium welding current to build up a molten puddle within said recess;

(f) then again lowering said electrical potential and again lowering said electrode feed rate to slightly lower than medium welding current to complete the build-up of said molten puddle within said recess; and (g) then increasing said electrical potential and stopping the feeding of said electrode whereby said electrode is burned back and prevented from sticking within said molten puddle.

5. A method of electric arc spot welding metal workpieces together by utilizing a consumable wire electrode which is fed into an arc struck between said wire electrode and said metal workpieces, comprising:

(a) supplying a preselected voltage and current for said arc to provide heat to preheat a finite zone of said metal workpieces;

(b) greatly increasing said voltage and current to a predetermined value to blow out sufficient material from said finite zone to form a deep recess;

(c) then decreasing said voltage and current in successive stages
   to melt the sides of said deep recess, and
   to gradually build up a molten puddle within said recess.

6. In the art of sigma spot welding metal workpieces utilizing a programmer to command a power supply and a motor speed control and also utilizing a consumable wire electrode fed by a motor at a rate determined by said motor speed control, said electrode and metal workpieces being in circuit relation with said power supply, the improved process comprising:

(a) striking an arc between said electrode and a welding zone of said metal workpieces;

(b) supplying a preselected electrical potential between said electrode and said workpieces and a preselected feeding rate for said electrode to provide for a medium welding current to heat said weld zone;

(c) then greatly increasing said electrical potential and greatly increasing said feed rate to provide a high welding current to blow out existing material from said weld zone to form a recess therein; and (d) then decreasing said electrical potential and said feed rate over an interval to gradually build up a molten puddle within said recess such that gases trapped and packed within the puddle will come to the surface of the puddle and escape and thermal cracking will be minimized.

7. A method of electric arc spot welding by varying the current, voltage and length of an arc struck between an electrode means and a metal workpiece, said electrode means providing a source of filler metal, comprising:

(a) providing a preselected voltage, current, and length for said arc to preheat a finite zone of said workpiece;

(b) greatly increasing said voltage and current to a predetermined value and extremely shortening said length to blow out sufficient material from said finite zone to form a recess;

(c) then decreasing said voltage and current and increasing said length to melt the sides of said recess; and (d) then decreasing said voltage and current in successive stages while holding the arc length substantially constant to gradually build up a molten puddle within said recess.

8. A method of electric arc spot welding by varying the current, voltage, and length of an arc struck between an electrode means and a metal workpiece, said electrode means providing a source of filler metal, comprising:

(a) providing a preselected arc voltage and a preselected arc current and a preselected arc length to preheat a finite zone of said workpiece while depositing very little metal from said electrode means;

(b) increasing said arc voltage and said arc current to a preselected value and extremely shortening said arc length to blow out sufficient material from said finite zone to form a recess; and (c) then increasing said arc length to a medium arc length and holding it substantially constant while decreasing said arc voltage and said arc current to preselected values for a plurality of seconds to gradually build up a molten puddle within said recess.

9. A method of electric arc spot welding by varying the current, voltage, and length of an arc struck between an electrode means and a metal workpiece, said electrode means providing a source of filler metal, comprising:

(a) providing a preselected arc voltage and a preselected arc current and a long arc length to preheat a finite zone of said workpiece while depositing very little metal within said finite zone from said electrode means;

(b) increasing said arc voltage and said arc current to a preselected value and extremely shortening said arc length to blow out sufficient material from said finite zone to form a recess; and (c) then increasing said arc length to a medium arc length and holding it substantially constant while successively decreasing said arc voltage and said arc current to preselected values to gradually build up a molten puddle within said recess so that gases which may be trapped and packed within the puddle will come to the surface and escape and thermal cracking will be minimized.

10. A method of electric arc spot welding metal workpieces together by utilizing a consumable wire electrode which is fed into an arc struck between said wire electrode and said metal workpieces, comprising:

(a) supplying a preselected arc heat and a long arc length for said arc to preheat a finite zone of said metal workpieces;

(b) greatly increasing said arc heat to a preselected value and extremely shortening said arc length to blow out sufficient material from said finite zone to form a recess;

(c) then decreasing said arc heat to a preselected value and increasing said arc length to a medium arc length to melt the sides of said recess; and (d) then decreasing said arc heat in successive stages while holding the arc length substantially constant to gradually build up a molten puddle within said recess.

11. A method of electric arc spot welding metal workpieces together by utilizing a consumable wire electrode which is fed into an arc struck between said wire electrode and said metal workpieces, comprising:

(a) supplying a preselected arc heat and a long arc length for said arc to preheat a finite zone of said metal workpieces;

(b) greatly increasing said arc heat to a preselected value and extremely shortening said arc length to blow out sufficient material from said finite zone to form a recess; and (c) then increasing said arc length to a medium arc length and holding it substantially constant while successively decreasing said arc heat to preselected values to gradually build up a molten puddle within said recess so that gases which may be trapped and packed within the puddle will come to the surface and escape and thermal cracking will be minimized.

12. A method of electric arc spot welding by varying the heat and length of an arc struck between an electrode means and a metal workpiece, said electrode means providing a source of filler metal, comprising:

(a) providing a preselected arc heat and a long arc length to preheat a finite zone of said workpieces while depositing very little metal within said finite zone from said electrode means;

(b) greatly increasing said arc heat to a preselected value and extremely shortening said arc length to blow out sufficient material from said finite zone to form a recess; and (c) then increasing said arc length to a medium arc length and holding it substantially constant while successively decreasing said arc heat to preselected values to gradually build up a molten puddle within said recess.

13. A method of electric arc spot welding by varying the heat and length of an arc struck between an electrode means and a metal workpiece, said electrode means providing a source of filler metal, comprising:

(a) providing a preselected arc heat and a preselected arc length to preheat a finite zone of said workpiece;

(b) increasing said arc heat to a preselected value and extremely shortening said arc length to blow out sufficient material from said finite zone to form a recess; and (c) then increasing said arc length to a medium arc length and holding it substantially constant while decreasing said arc heat to preselected values for a plurality of seconds to gradually build up a molten puddle within said recess.

References Cited in the file of this patent

UNITED STATES PATENTS

| | | |
|---|---|---|
| 2,284,351 | Wyer | May 26, 1942 |
| 2,345,037 | De Gray | Mar. 28, 1944 |
| 2,449,917 | Tansley | Sept. 21, 1948 |
| 2,806,127 | Hackman et al. | Sept. 10, 1957 |
| 3,053,966 | Landis et al. | Sept. 11, 1962 |